(12) United States Patent
Ueki

(10) Patent No.: US 7,075,589 B2
(45) Date of Patent: Jul. 11, 2006

(54) COLOR KILLER ADJUSTMENT DEVICE

(75) Inventor: Keijiro Ueki, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 549 days.

(21) Appl. No.: 10/618,807

(22) Filed: Jul. 14, 2003

(65) Prior Publication Data

US 2004/0051814 A1    Mar. 18, 2004

(30) Foreign Application Priority Data

Sep. 17, 2002    (JP)    ............................ 2002-269892

(51) Int. Cl.
*H04N 9/70*    (2006.01)
(52) U.S. Cl. ...................... 348/643; 348/644
(58) Field of Classification Search ................ 348/643, 348/644, 624, 645, 647, 648, 646, 708, 713; H04N 9/70
See application file for complete search history.

(56) References Cited

U.S. PATENT DOCUMENTS 4,253,108 A * 2/1981 Engel .......................... 348/644
4,785,346 A * 11/1988 Yoshimochi ................. 348/647
5,389,979 A * 2/1995 Jeong .......................... 348/644

FOREIGN PATENT DOCUMENTS

JP    54-048435    4/1979
JP    56-54185    5/1981

* cited by examiner

*Primary Examiner*—Michael H. Lee
(74) *Attorney, Agent, or Firm*—Fish & Richardson P.C.

(57)    ABSTRACT

A conventional method to determine an onset point of a color killer function by design of the external circuit requires physical work to change external parts and their component values varying from one model to another. Therefore, an alternative method to adjust the onset point of the color killer function without requiring such work has been sought for. This invention offers a color killer adjustment device, which adjusts the onset point of the color killer function to switch off the color signal in video signals, having a CPU to store and output a control signal to determine the onset point of the color killer function, a color killer control circuit which generates the reference voltage corresponding to the control signal from the CPU and a comparator which compares a signal representing the level of the color burst signal in the color signal with the reference voltage and outputs a signal to disable the color signal in the video signals according to a result of the comparison.

6 Claims, 1 Drawing Sheet

COLOR KILLER ADJUSTMENT DEVICE

BACKGROUND OF THE INVENTION

1. Field of the Invention

This invention relates to a color killer adjustment device used in a TV receiver, specifically to a color killer adjustment device suitable for a configuration in which a CPU (a microcomputer) and a TV signal processing IC are combined, or integrated into a single chip.

2. Description of the Related Art

A TV receiver has a color killer function which intentionally switches off a color signal when the reception is poor due to weak airwaves or the like. To be more specific, a color burst signal in the color signal is converted to a DC (direct current) voltage by smoothing it. And the converted DC voltage is compared with a reference voltage. The color signal is used when the converted DC voltage is larger than the reference voltage. The color signal is forbidden when the converted DC voltage is smaller than the reference voltage. A clear picture is obtained as a result.

A level of the color burst signal at which the color killer function is to be enabled varies depending on each model of the TV receiver, a place of destination, designer's requirement and so on. With this being the situation, the reference voltage is conventionally made adjustable from outside the terminals of the TV signal processing IC. By doing so, an onset point of the color killer function can be freely determined by design of an external circuit of the TV signal processing IC.

However, the method to determine the onset point of the color killer function by design of the external circuit requires physical work to change external parts and their component values which vary from one model to another. Therefore, an alternative method to adjust the onset point of the color killer function without requiring such work has been sought for.

SUMMARY OF THE INVENTION

This invention is directed to solve the problems addressed above, and offers a color killer adjustment device, which adjusts the onset point of the color killer function to switch off the color signal in video signals, having a CPU to store and output a control signal to determine the onset point of the color killer function, a color killer control circuit which generates the reference voltage corresponding to the control signal from the CPU and a comparator which compares a signal representing the level of the color burst signal in the color signal with the reference voltage and outputs a signal to disable the color signal in the video signals according to a result of the comparison, wherein the control signal from the CPU is selected according to the desired onset point of the color killer function.

This invention also offers a color killer adjustment device, which adjusts the onset point of the color killer function to switch off the color signal in the video signals, having a memory to store the control signal to determine the onset point of the color killer function, a CPU to read out the control signal stored in the memory, a color killer control circuit which generates the reference voltage corresponding to the control signal from the CPU and a comparator which compares the signal representing the level of the color burst signal in the color signal with the reference voltage and output a signal to disable the color signal in the video signals according to a result of the comparison, wherein the control signal stored in the memory is selected according to the desired onset point of the color killer function.

DETAILED DESCRIPTION OF THE INVENTION

Figure 1:
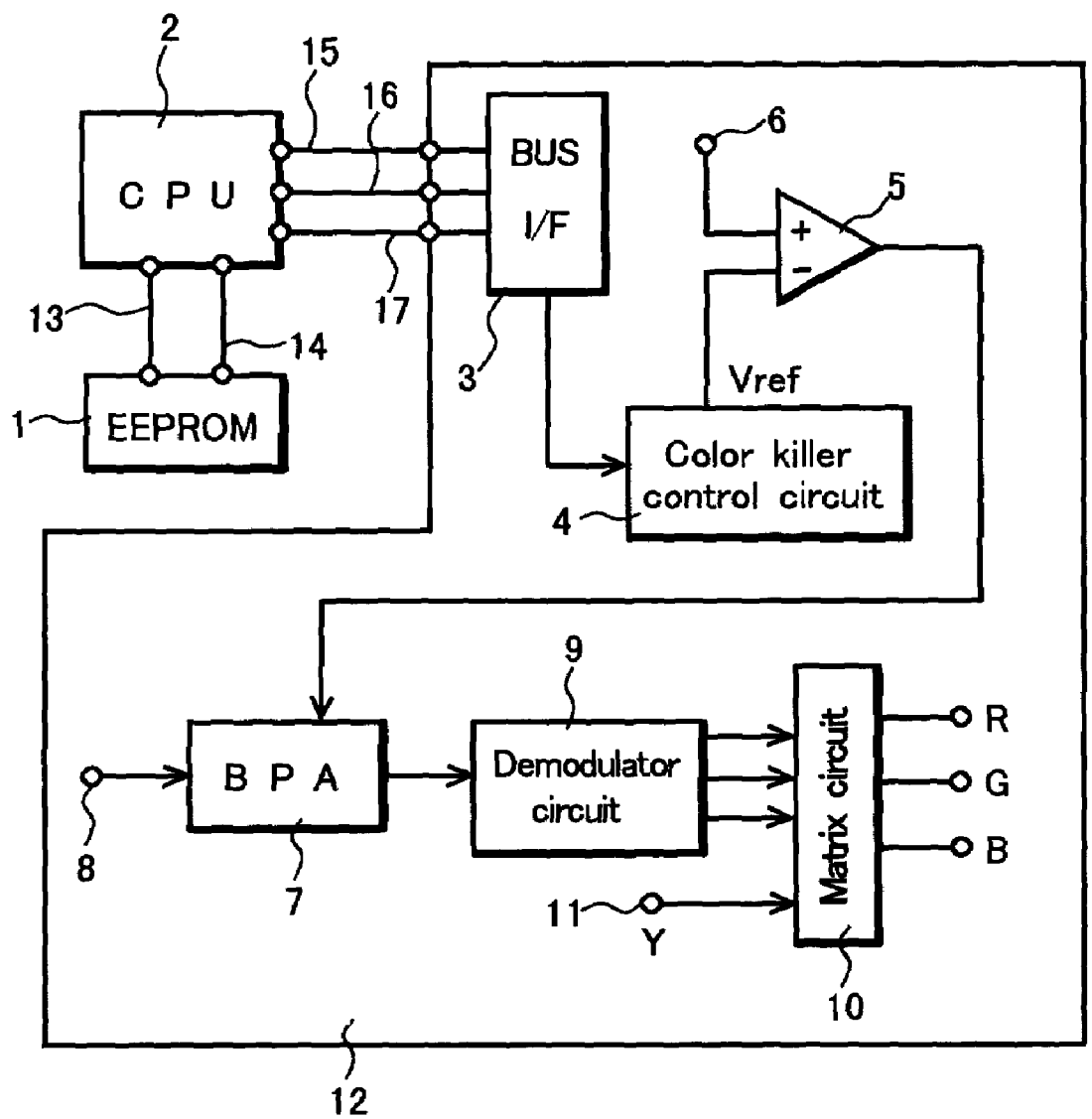
FIG. 1 is a block diagram showing the color killer adjustment device according to an embodiment of this invention.

Next, an embodiment of this invention will be described referring to FIG. 1. An EEPROM (Electrically Erasable Programmable ROM) 1 stores a control signal which determines an onset point of a color killer function. A CPU 2 reads out the control signal stored in the EEPROM 1. A bus interface circuit 3 interfaces the control signal transmitted through bus lines 15, 16 and 17 from the CPU 2.

A color killer control circuit 4 generates the reference voltage corresponding to the control signal from the bus interface circuit 3. A comparator 5 compares the signal representing the level of a color burst signal in the color signal coming from a terminal 6 with the reference voltage Vref from the color killer control circuit 4.

A BPA (Band Pass Amplifier) 7 modifies a level of the color signal from a terminal 8. A demodulator circuit 9 demodulates the color signal from the BPA 7 to generate three color-difference signals R-Y, G-Y and B-Y. A matrix circuit 10 adds Y (Brightness) signal from a terminal 11 and each of the three color-difference signals R-Y, G-Y and B-Y to generate three primary color signals R, G and B.

A TV signal processing IC 12 includes the bus interface circuit 3, the color killer control circuit 4, the comparator 5, the BPA 7, the demodulator circuit 9 and the matrix circuit 10, and is implemented in a single semiconductor chip. The EEPROM 1 and the CPU 2 are connected with two-wire bus lines 13 and 14, while the CPU 2 and the TV signal processing IC 12 are connected with three-wire bus lines 15, 16 and 17.

These three semiconductor chips may be encapsulated in a single package to appear to be a single semiconductor component. Or the three semiconductor chips may be integrated into a single chip. Since a CPU is usually equipped with a function of ROM, the control signal may be stored in the CPU 2. Note that reprogramming the control signal later on is easier when the control signal is stored in the EEPROM 1.

Next, operation of the device mentioned above will be described. The reference voltage Vref generated from the color killer control circuit 4 is set to one of eight values which are a digital value 0 through a digital value 7, for example. A desired value of Vref is set freely according to the model of the TV receiver, the place of destination, designer's requirements and so on. By changing the reference voltage Vref, the color killer function is made either easily enabled or not easily enabled.

For example, a digital value 5 is stored in the EEPROM, assuming that the color killer function is easily enabled for the digital value 5. Then the CPU 2 reads the digital value 5 from the EEPROM 1 through the bus lines 13 and 14. Next, the CPU 2 applies the digital value 5 to the bus interface circuit 3 through the bus lines 15, 16 and 17. A role of the bus interface circuit 3 is to convert serial data from the CPU to parallel data, so that the data can be applied to the color killer control circuit 4.

When an output signal from the bus interface circuit 3 is applied to the color killer control circuit 4, the reference voltage Vref is turned to be a value which corresponds to the digital value 5. The value is to make the color killer function easily enabled, and is set to be a little bit smaller than the average level of the color burst signal from the terminal 6. By doing so, an output of the comparator 5 is inverted to low level when the level of the color burst signal is slightly lowered. The BPA 7 operates with normal gain while the output of the comparator 5 is at high level. When the output of the comparator becomes low, the gain of the BPA 7 turns to zero, cutting off transfer of the color signal to the demodulator circuit 9.

The demodulator circuit 9 demodulates the color signal from the BPA 7 to generate the three color-difference signals R-Y, G-Y and B-Y. Each of the three color difference signals R-Y, G-Y and B-Y is added to the Y (Brightness) signal from the terminal 11 in the matrix circuit 10 to obtain each of the three primary color signals R, G and B.

Therefore, the color killer function is set to be easily enabled with the digital value 5stored in the EEPROM 1.

When it is preferred that the color killer function is not easily enabled, the reference voltage Vref generated from the color killer control circuit 4 is set to be much smaller than the average level of the color burst signal from the terminal 6. By doing so, the comparator 5 is not easily inverted when the level of the color burst signal is lowered. Assuming the setting described above corresponds to a digital value 3, what it takes is storing the digital value 3 in the EEPROM 1. By doing so, the CPU 2 operates as in the case with the digital value 5, and the reference voltage Vref generated from the color killer control circuit 4 is lowered. Hence the onset point of the color killer function can be freely set by only reprogramming the EEPROM 1, according to the device described above.

According to this invention, the onset point of the color killer function can be freely set by only changing the data stored in the memory, negating the need for the work to change the external parts. Hence it is easier to meet the requirement on the various onset points of the color killer function depending on each model of the TV receiver, a place of destination, designer's requirement and so on.

What is claimed is:

1. A color killer adjustment device to adjust an onset point of a color killer function to disable a color signal in video signals, comprising:
    a CPU to store and output a control signal to determine the onset point of the color killer function;
    a color killer control circuit which generates a reference voltage corresponding to the control signal from the CPU; and
    a comparator which compares a signal representing a level of a color burst signal in the color signal with the reference voltage and outputs a signal to disable the color signal in the video signals according to a result of the comparison,
    wherein the control signal from the CPU is selected according to a desired onset point of the color killer function.

2. The color killer adjustment device of claim 1, wherein the CPU, the color killer control circuit and the comparator are packaged in a single package.

3. The color killer adjustment device of claim 1, further comprising a bus interface circuit which receives the control signal from the CPU transmitted through a bus line and transfers the control signal to the color killer control circuit.

4. A color killer adjustment device to adjust an onset point of a color killer function to disable a color signal in video signals, comprising:
    a memory to store a control signal to determine the onset point of the color killer function;
    a CPU to read out the control signal stored in the memory;
    a color killer control circuit which generates a reference voltage corresponding to the control signal from the CPU; and
    a comparator which compares a signal representing a level of a color burst signal in the color signal with the reference voltage and outputs a signal to disable the color signal in the video signals according to a result of the comparison,
    wherein the control signal stored in the memory is selected corresponding to a desired onset point of the color killer function.

5. The color killer adjustment device of claim 4, wherein the memory, the CPU, the color killer control circuit and the comparator are packaged in a single package.

6. The color killer adjustment device of claim 4, further comprising a bus interface circuit which receives the control signal from the CPU transmitted through a bus line and transfers the control signal to the color killer control circuit.

* * * * *